United States Patent
Nunez

(10) Patent No.: US 10,068,452 B1
(45) Date of Patent: Sep. 4, 2018

(54) VEHICLE ALERT SYSTEM

(71) Applicant: Maykel Nunez, Cape Coral, FL (US)

(72) Inventor: Maykel Nunez, Cape Coral, FL (US)

( * ) Notice: Subject to any disclaimer, the term of this patent is extended or adjusted under 35 U.S.C. 154(b) by 0 days.

(21) Appl. No.: 15/587,029

(22) Filed: May 4, 2017

(51) Int. Cl.
*G08B 21/02* (2006.01)
*B60N 2/00* (2006.01)
*B60N 2/26* (2006.01)
*B60R 16/03* (2006.01)
*G01G 19/52* (2006.01)

(52) U.S. Cl.
CPC ......... *G08B 21/0205* (2013.01); *B60N 2/002* (2013.01); *B60N 2/26* (2013.01); *B60R 16/03* (2013.01); *G01G 19/52* (2013.01)

(58) Field of Classification Search
CPC .............. G08B 21/0205; G08B 21/22; G08B 21/0288; G08B 21/0247; G08B 21/0213; B60N 2/002; B60N 2/2866; G05D 23/19; B60W 40/10; B60R 22/105
USPC ............. 340/457, 457.1, 539.11, 686.6, 667, 340/573.1; 297/250.1
See application file for complete search history.

(56) References Cited

U.S. PATENT DOCUMENTS

| 7,009,522 | B2 | 3/2006 | Flanagan et al. | |
|---|---|---|---|---|
| 7,230,530 | B1 | 6/2007 | Almquist | |
| 7,378,979 | B2 | 5/2008 | Rams, Jr. | |
| 8,058,983 | B1* | 11/2011 | Davisson | G08B 21/0205 340/10.1 |
| D650,715 | S | 12/2011 | Hill et al. | |
| 8,841,997 | B2 | 9/2014 | Silveira | |
| 2005/0030188 | A1* | 2/2005 | Flanagan | B60R 99/00 340/667 |
| 2006/0033613 | A1 | 2/2006 | Reece | |
| 2007/0075574 | A1* | 4/2007 | James | B60N 2/002 297/217.3 |
| 2008/0316043 | A1 | 12/2008 | Gomes | |
| 2009/0079557 | A1* | 3/2009 | Miner | B60N 2/002 340/457.1 |
| 2009/0277190 | A1* | 11/2009 | Piette | B60H 1/00264 62/56 |
| 2010/0078978 | A1* | 4/2010 | Owens | B60N 2/002 297/250.1 |
| 2010/0253498 | A1* | 10/2010 | Rork | B60N 2/002 340/457.1 |
| 2013/0049955 | A1* | 2/2013 | Hoover | B60N 2/002 340/539.11 |
| 2013/0106598 | A1* | 5/2013 | Silveira | B60N 2/28 340/457.1 |

(Continued)

FOREIGN PATENT DOCUMENTS

WO    WO2008030417    3/2008

*Primary Examiner* — Firmin Backer
*Assistant Examiner* — Munear Akki

(57) ABSTRACT

A vehicle alert system inhibiting a child from being left unattended in a vehicle includes a car seat that is selectively positioned in a vehicle and child is selectively seated in the car seat. A base unit is positioned upon the seat to be sat upon thereby facilitating the base unit to detect weight. The base unit is turned on when the base unit detects weight. A remote unit is carried by the driver of the vehicle. The remote unit is in electrical communication with the base unit. Moreover, the remote unit emits an audible alarm when the remote unit moves beyond a trigger distance from the base unit and the base unit is turned on. In this way the remote unit inhibits the child from being left unattended in the vehicle.

13 Claims, 4 Drawing Sheets

(56) References Cited

U.S. PATENT DOCUMENTS

| | | | |
|---|---|---|---|
| 2013/0307684 A1* | 11/2013 | Pallotta | H04M 1/72577 |
| | | | 340/539.11 |
| 2014/0253313 A1* | 9/2014 | Schoenberg | B60N 2/28 |
| | | | 340/457 |
| 2014/0253314 A1* | 9/2014 | Rambadt | B60N 2/002 |
| | | | 340/457.1 |
| 2014/0266662 A1* | 9/2014 | Matos | G08B 21/0288 |
| | | | 340/457 |
| 2016/0042624 A1* | 2/2016 | Quave | B60N 2/002 |
| | | | 340/457 |
| 2016/0362046 A1* | 12/2016 | Gordon | B60Q 9/00 |
| 2017/0116839 A1* | 4/2017 | Friedman | G08B 21/0283 |

* cited by examiner

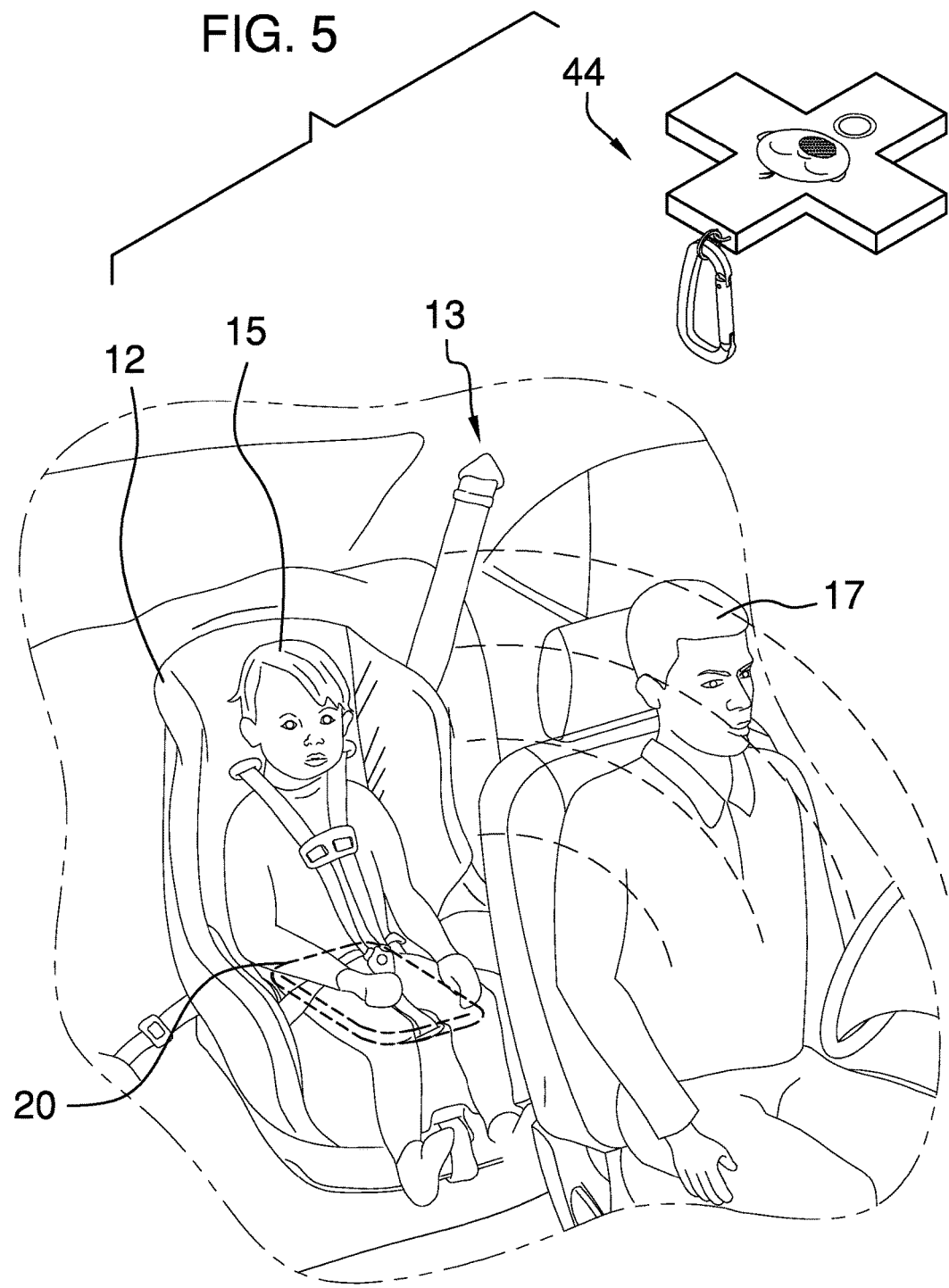

VEHICLE ALERT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to alert devices and more particularly pertains to a new alert device for inhibiting a child from being left unattended in a vehicle.

BRIEF SUMMARY OF THE INVENTION

An embodiment of the disclosure meets the needs presented above by generally comprising a car seat that is selectively positioned in a vehicle and child is selectively seated in the car seat. A base unit is positioned upon the seat to be sat upon thereby facilitating the base unit to detect weight. The base unit is turned on when the base unit detects weight. A remote unit is carried by the driver of the vehicle. The remote unit is in electrical communication with the base unit. Moreover, the remote unit emits an audible alarm when the remote unit moves beyond a trigger distance from the base unit and the base unit is turned on. In this way the remote unit inhibits the child from being left unattended in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure.

DETAILED DESCRIPTION OF THE INVENTION

Figure 1:
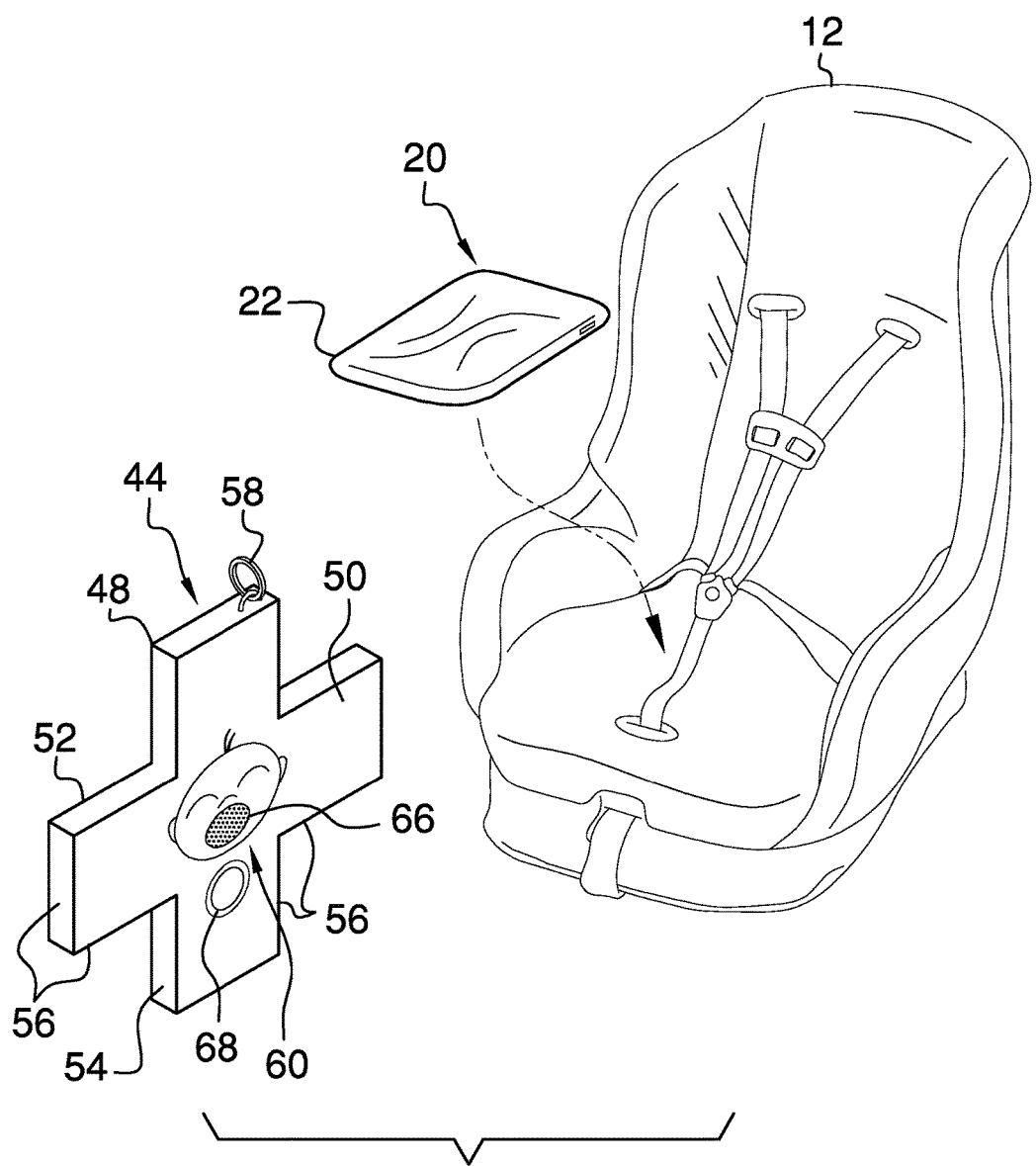
FIG. 1 is a perspective view of a vehicle alert system according to an embodiment of the disclosure.
Figure 2:
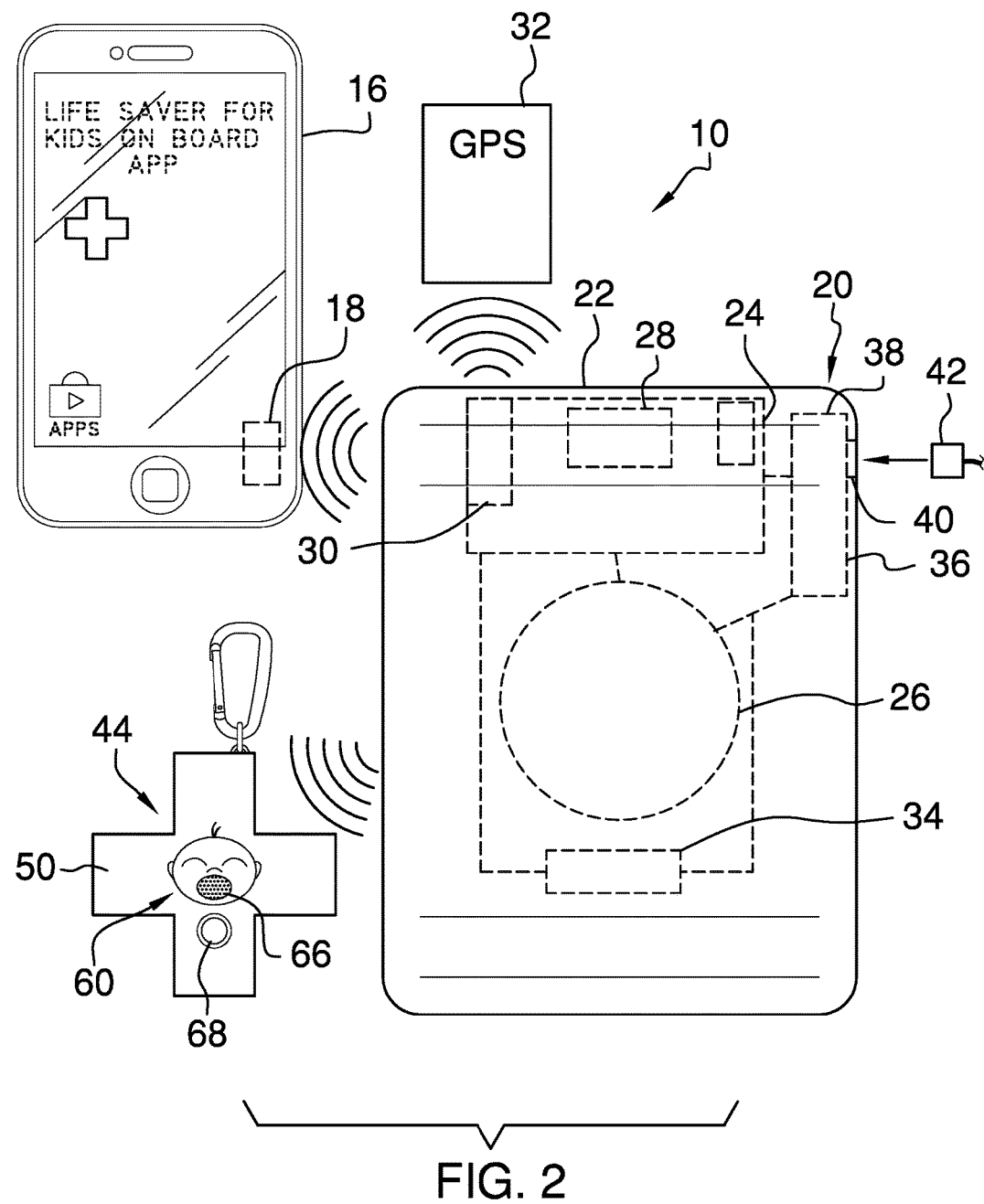
FIG. 2 is a front phantom view of an embodiment of the disclosure.
Figure 3:
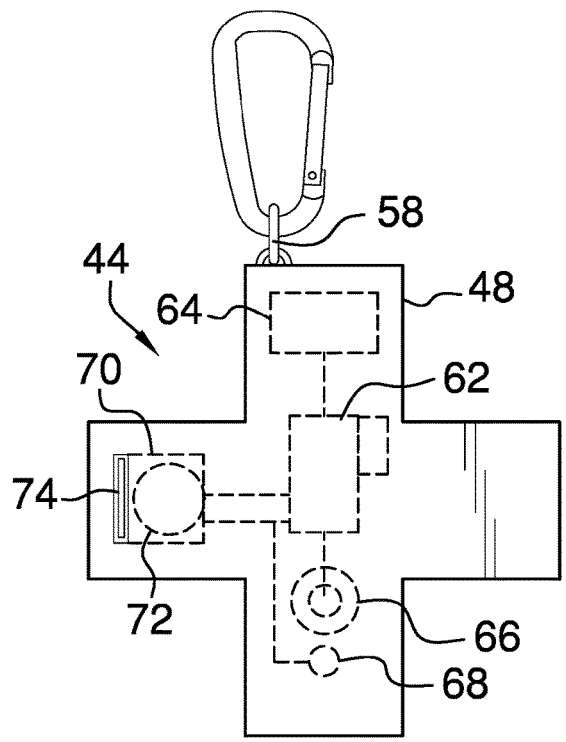
FIG. 3 is a back phantom view of remote unit of an embodiment of the disclosure.
Figure 4:
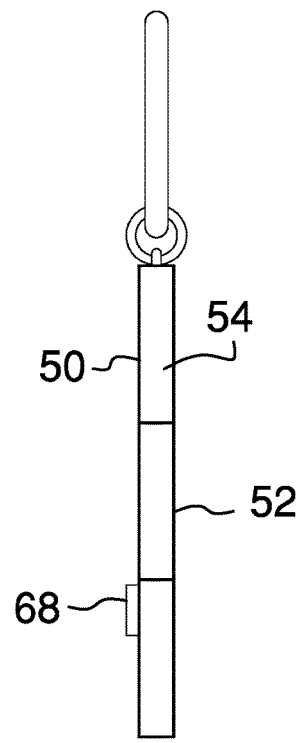
FIG. 4 is a right side view of a remote unit of an embodiment of the disclosure.

With reference now to the drawings, and in particular to FIGS. 1 through 5 thereof, a new alert device embodying the principles and concepts of an embodiment of the disclosure and generally designated by the reference numeral 10 will be described.

As best illustrated in FIGS. 1 through 5, the vehicle alert system 10 generally comprises a car seat 12 that is positioned in a vehicle 13. The car seat 12 has a cushion 14 to be sat upon by a child 15. The car seat 12 may be a child car seat 12 of any conventional design and the vehicle 13 may be a passenger vehicle or the like. An electronic device 16 is provided and the electronic is manipulated by a driver 17 of the vehicle 13. The electronic device 16 has a first transceiver 18 and the electronic device 16 may be a smart phone, an I-pad or any other electronic device 16 that has electronic data storage and wireless communication.

A base unit 20 is provided and the base unit 20 is positioned upon the cushion 14. The base unit 20 is sat upon when the child 15 sits in the car seat 12 thereby facilitating the base unit 20 to detect weight. The base unit 20 is turned on when the base unit 20 detects weight. The base unit 20 comprises a pad 22 that is positioned upon the cushion 14 on the car seat 12. In this way the pad 22 is sat upon when the child 15 is positioned in the car seat 12.

A first processor 24 is provided and the first processor 24 is positioned within the pad 22. The first processor 24 selectively generates an on sequence and the first processor 24 selectively generates an alert sequence. The first processor 24 may be an electronic processor or the like. A weight sensor 26 is positioned within the pad 22 to sense weight when the pad 22 is sat upon. The weight sensor 26 is electrically coupled to the first processor 24 and the first processor 24 generates the on sequence when the weight sensor 26 senses weight. The weight sensor 26 may be an electronic weight sensor 26. Moreover, the weight sensor 26 may have a minimum threshold of approximately 2.5 kg. The first processor 24 does not generate the on sequence unless the weight sensor 26 senses weight that is greater than the minimum threshold.

A second transceiver 28 is positioned within the pad 22 and the second transceiver 28 is electrically coupled to the first processor 24. The second transceiver 28 is in electrical communication with the first transceiver 18. Additionally, the second transceiver 28 may be a radio frequency transceiver that employs a WPAN signal and Bluetooth communication protocols. A global positioning system (gps) transceiver 30 is positioned within the pad 22 and the gps transceiver 30 is electrically coupled to the first processor 24. The gps transceiver 30 is in electrical communication with a global positioning system 32 thereby facilitating the gps transceiver 30 to establish a physical location of the pad 22.

A signal analyzer 34 is positioned within the pad 22 and the signal analyzer 34 is electrically coupled to the first processor 24. The signal analyzer 34 may be an electronic signal analyzer 34 or the like that is capable of determining distance between a signal source and the second transceiver 28. A first power supply 36 is positioned within the pad 22 and the first power supply 36 is electrically coupled to the first processor 24.

The first power supply 36 comprises at least one first battery 38 that is positioned within the pad 22. A first charge port 40 is coupled to the pad 22 and the first charge port 40 is selectively electrically coupled to a power source 42. The first charge port 40 is electrically coupled to the at least one first battery 38 to charge the at least one first battery 38. The first charge port 40 may be a USB port or the like and the power source 42 may be a battery charger.

A remote unit 44 is provided and the remote unit 44 is carried by a driver 17 of the vehicle 13. The remote unit 44 is in electrical communication with the base unit 20. Moreover, the remote unit 44 emits an audible alarm when the remote unit 44 moves beyond a trigger distance from the base unit 20 and the base unit 20 is turned on. In this way the remote unit 44 inhibits the child 15 from being left unattended in the vehicle 13.

The remote unit 44 comprises a housing 48 that has a first wall 50, a second wall 52 and a peripheral wall 54 extending therebetween. The peripheral wall 54 has a plurality of intersecting sides 56 such that the housing 48 has a plus shape. A ring 58 is coupled to the peripheral wall 54 of the housing 48 and the ring 58 is coupled to keys of the vehicle 13. Indicia 60 may be printed on the first wall 50 and the indicia 60 may comprise an image of a baby's face.

A second processor 62 is positioned within the housing 48 and the second processor 62 selectively generates an alarm sequence. The second processor 62 may be an electronic processor or the like. A third transceiver 64 is positioned within the housing 48 and the third transceiver 64 is electrically coupled to the second processor 62. The third transceiver 64 is in electrical communication with the second transceiver 28. The third transceiver 64 may be a radio transceiver or the like that employs a WPAN signal and Bluetooth communication protocols. Moreover, the signal analyzer 34 analyzes the signal strength between the second transceiver 28 and the third transceiver 64. In this way the signal analyzer 34 determines a distance between the first and second transceiver 28s.

The first processor 24 generates the alert sequence when the signal analyzer 34 determines the signal strength between the first 28 and third transceivers 64 drops below a trigger threshold. The trigger threshold may be a signal strength that corresponds to a trigger distance between the second 28 and third 64 transceivers. The trigger distance may range between approximately 3.0 meters and 6.0 meters. The second processor 62 generates the alarm sequence when the third transceiver 64 receives the on sequence and the alert sequence from the second transceiver 28.

A speaker 66 is coupled to the housing 48 and the speaker 66 selectively emits an audible alarm outwardly therefrom. The speaker 66 is electrically coupled to the second processor 62 and the speaker 66 is turned on when the second processor 62 generates the alarm sequence. In this way the speaker 66 alerts the driver 17 that the child 15 has been left unattended in the vehicle 13. The speaker 66 may be an electronic speaker 66 or the like. A button 68 is movably coupled to the housing 48 and the button 68 is selectively manipulated. The button 68 is electrically coupled to the second processor 62 such that the button 68 turns the second processor 62 on and off.

A second power supply 70 is coupled to the housing 48 and the second power supply 70 is electrically coupled to the second processor 62. The second power supply 70 comprises at least one second battery 72 that is positioned within the housing 48. A second charge port 74 is coupled to the housing 48 and the second charge port 74 is electrically coupled to the at least one second battery 72. The second charge port 74 is selectively electrically coupled to a power source 42 to charge the at least one second battery 72. The second charge port 74 may be a USB port or the like and the power source 42 may be a battery charger.

In use, the pad 22 is positioned on the cushion 14 in the car seat 12 and the child 15 is seated on the pad 22 when the child 15 is placed in the car seat 12. The first processor 24 generates the on sequence to place the second 28 and third 64 transceivers in wireless communication with each other when the weight sensor 26 senses the weight of the child 15. Additionally, the electronic device 16 is selectively synched with the second transceiver 28. The first processor 24 generates the alert sequence when the signal analyzer 34 determines that the housing 48 has been moved beyond the trigger distance from the pad 22 and the weight sensor 26 senses the weight that is greater than the minimum threshold. Thus, the second processor 62 generates the alarm sequence and the speaker 66 emits the audible alarm. In this way the driver 17 of the vehicle 13 is alerted that the child 15 has been left unattended in the vehicle 13.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle alert system being configured to emit an audible alert when a child is left unattended in a vehicle, said system comprising:

a car seat being configured to be positioned in a vehicle, said car seat having a cushion being configured to be sat upon by a child;

an electronic device being configured to be manipulated;

a base unit being positioned upon said cushion wherein said base unit is configured to be sat upon thereby facilitating said base unit to detect weight, said base unit being turned on when said base unit detects weight, said base unit comprises a pad being positioned upon said cushion on said car seat wherein said pad is configured to be sat upon;

a first processor being positioned within said pad, said first processor selectively generating an on sequence, said first processor selectively generating an alert sequence; and a remote unit being configured to be carried by a driver of the vehicle, said remote unit being in electrical communication with said base unit, said remote unit emitting an audible alarm when said remote unit moves beyond a trigger distance from said base unit and said base unit is turned on wherein said remote unit is configured to inhibit the child from being left unattended in the vehicle, said remote unit comprising a housing having a first wall, a second wall and a peripheral wall extending therebetween, said peripheral wall having a plurality of intersecting sides such that said housing has a plus shape;

a second processor being positioned within said housing, said second processor selectively generating an alarm sequence; and a second power supply being coupled to said housing, said second power supply being electrically coupled to said second processor, said second power supply comprising at least one second battery being positioned within said housing, and a second charge port being coupled to said housing, said second charge port being electrically coupled to said at least one second battery via usb.

2. The system according to claim 1, further comprising a weight sensor being positioned within said pad wherein said weight sensor is configured to sense weight when said pad is sat upon, said weight sensor being electrically coupled to said first processor such that said first processor generates said on sequence when said weight sensor senses weight.

3. The system according to claim 1, further comprising:
a first transceiver; and
a second transceiver being positioned within said pad, said second transceiver being electrically coupled to said first processor, said second transceiver being in electrical communication with said first transceiver.

4. The system according to claim 1, further comprising a global positioning system (gps) transceiver being positioned within said pad, said gps transceiver being electrically coupled to said first processor, said gps transceiver being configured to be in electrical communication with a global positioning system thereby facilitating said gps transceiver to establish a physical location of said pad.

5. The system according to claim 1, further comprising a signal analyzer being positioned within said pad, said signal analyzer being electrically coupled to said first processor.

6. The system according to claim 1, further comprising a first power supply being positioned within said pad, said first power supply being electrically coupled to said first processor.

7. The system according to claim 6, wherein said first power supply comprises:
at least one first battery being positioned within said pad;
a first charge port being coupled to said pad wherein said first charge port is configured to be electrically coupled to a power source, said first charge port being electrically coupled to said at least one first battery to charge said at least one first battery.

8. The system according to claim 1, further comprising a ring being coupled to said peripheral wall of said housing wherein said ring is configured to be coupled to keys of the vehicle.

9. The system according to claim 1, further comprising:
a second transceiver;
a third transceiver being positioned within said housing, said third transceiver being electrically coupled to said second processor, said third transceiver being in electrical communication with said second transceiver, said signal analyzer analyzing a signal strength between said second transceiver and said third transceivers.

10. The system according to claim 9, further comprising:
a first processor selectively generating an alert sequence and an on sequence; and
said first processor generating said alert sequence when said signal analyzer determines said signal strength between said second and third transceivers drops below a trigger threshold, said second processor generating said alarm sequence when said third transceiver receives said on sequence and said alert sequence from said second transceiver.

11. The system according to claim 1, further comprising a speaker being coupled to said housing wherein said speaker is configured to selectively emit an audible alarm outwardly therefrom, said speaker being electrically coupled to said second processor, said speaker being turned on when said second processor generates said alarm sequence wherein said speaker is configured to alert the driver that the child has been left unattended in the vehicle.

12. The system according to claim 1, further comprising a button being movably coupled to said housing wherein said button is configured to be manipulated, said button being electrically coupled to said second processor such that said button turns said second processor on and off.

13. A vehicle alert system being configured to emit an audible alert when a child is left unattended in a vehicle, said system comprising:

a car seat being configured to be positioned in a vehicle, said car seat having a cushion being configured to be sat upon by a child;

an electronic device being configured to be manipulated, said electronic device having a first transceiver;

a base unit being positioned upon said cushion wherein said base unit is configured to be sat upon thereby facilitating said base unit to detect weight, said base unit being turned on when said base unit detects weight, said base unit comprising:

a pad being positioned upon said cushion on said car seat wherein said pad is configured to be sat upon, a first processor being positioned within said pad, said first processor selectively generating an on sequence, said first processor selectively generating an alert sequence, a weight sensor being positioned within said pad wherein said weight sensor is configured to sense weight when said pad is sat upon, said weight sensor being electrically coupled to said first processor such that said first processor generates said on sequence when said weight sensor senses weight, a second transceiver being positioned within said pad, said second transceiver being electrically coupled to said first processor, said second transceiver being in electrical communication with said first transceiver, a global positioning system (gps) transceiver being positioned within said pad, said gps transceiver being electrically coupled to said first processor, said gps transceiver being configured to be in electrical communication with a global positioning system thereby facilitating said gps transceiver to establish a physical location of said pad, a signal analyzer being positioned within said pad, said signal analyzer being electrically coupled to said first processor, and a first power supply being positioned within said pad, said first power supply being electrically coupled to said first processor, said first power supply comprising:
  at least one first battery being positioned within said pad, and
  a first charge port being coupled to said pad wherein said first charge port is configured to be electrically coupled to a power source, said first charge port being electrically coupled to said at least one first battery to charge said at least one first battery; and a remote unit being configured to be carried by a driver of the vehicle, said remote unit being in electrical communication with said base unit, said remote unit emitting an audible alarm when said remote unit moves beyond a trigger distance from said base unit and said base unit is turned on wherein said remote unit is configured to inhibit the child from being left unattended in the vehicle, said remote unit comprising:
  a housing having a first wall, a second wall and a peripheral wall extending therebetween, said peripheral wall having a plurality of intersecting sides such that said housing has a plus shape,
  a ring being coupled to said peripheral wall of said housing wherein said ring is configured to be coupled to keys of the vehicle,
  a second processor being positioned within said housing, said second processor selectively generating an alarm sequence,
  a third transceiver being positioned within said housing, said third transceiver being electrically coupled to said second processor, said third transceiver being in electrical communication with said second transceiver, said signal analyzer analyzing a signal strength between said second transceiver and said third transceiver, said first processor generating said alert sequence when said signal analyzer determines said signal strength between said second and third transceivers drops below a trigger threshold, said second processor generating said alarm sequence when said third transceiver receives said on sequence and said alert sequence from said second transceiver,
  a speaker being coupled to said housing wherein said speaker is configured to selectively emit an audible alarm outwardly therefrom, said speaker being electrically coupled to said second processor, said speaker being turned on when said second processor generates said alarm sequence wherein said speaker is configured to alert the driver that the child has been left unattended in the vehicle,
  a button being movably coupled to said housing wherein said button is configured to be manipulated, said button being electrically coupled to said second processor such that said button turns said second processor on and off, and
  a second power supply being coupled to said housing, said second power supply being electrically coupled to said second processor, said second power supply comprising:
    at least one second battery being positioned within said housing, and
    a second charge port being coupled to said housing, said second charge port being electrically coupled to said at least one second battery via USB.

* * * * *